Jan. 9, 1923.
M. A. SHOTWELL.
DEMOUNTABLE TREAD FOR PNEUMATIC TIRES.
FILED AUG. 28, 1922.
1,441,458
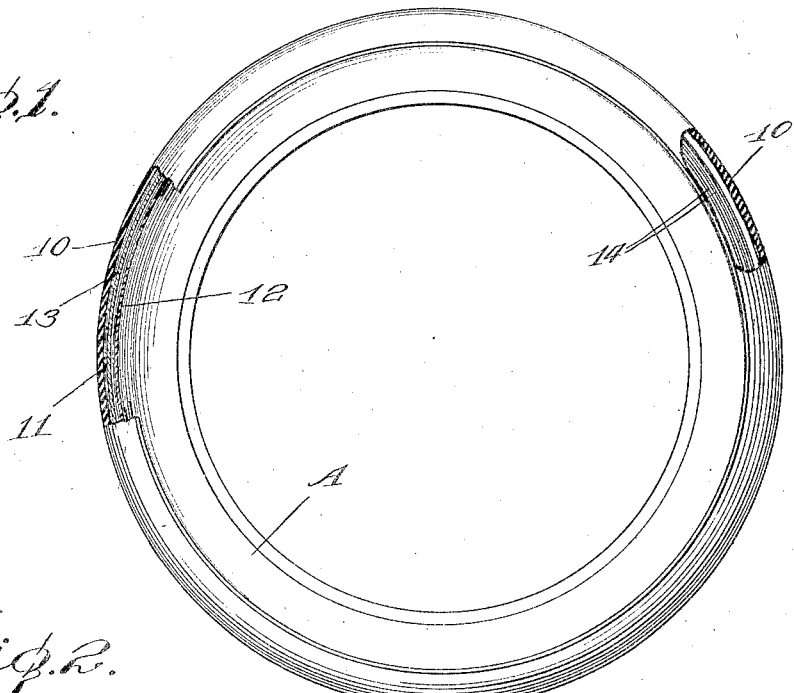
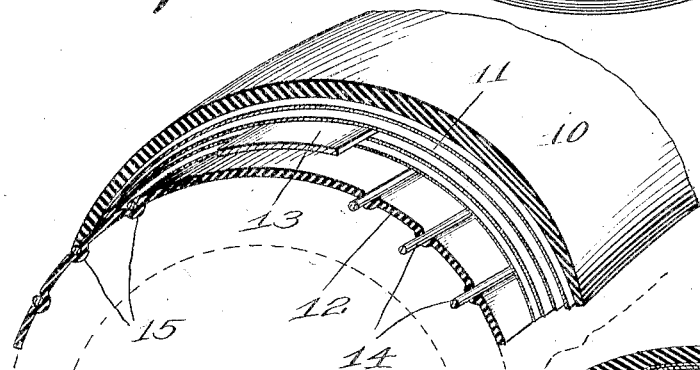
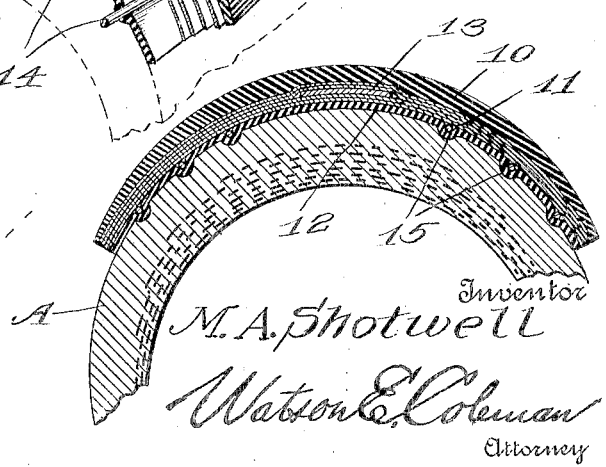
Inventor
M. A. Shotwell
Watson E. Coleman
Attorney Patented Jan. 9, 1923.

1,441,458

UNITED STATES PATENT OFFICE.

MARCUS A. SHOTWELL, OF CHICAGO, ILLINOIS.

DEMOUNTABLE TREAD FOR PNEUMATIC TIRES.

Application filed August 28, 1922. Serial No. 584,835.

*To all whom it may concern:*

Be it known that I, MARCUS A. SHOTWELL, a citizen of the United States, residing at Chicago, in the county of Cook and State of Illinois, have invented certain new and useful Improvements in Demountable Treads for Pneumatic Tires, of which the following is a specification, reference being had to the accompanying drawings.
This invention relates to pneumatic tires, and particularly to the treads thereof.

The general object of my invention is to provide a demountable tread, that is one which may be readily applied to a pneumatic tire or readily removed therefrom and which, when in place upon the tire and the tire inflated, will be held firmly in place against any lateral or longitudinal slip.

A further object is to provide a construction of this kind of extreme simplicity and effectiveness, and to provide a tread of this character which will lessen the cost of maintaining tires, and to provide a detachable tread which is made up of a rubber tread portion proper and fabric layers which are vulcanized to the tread portion proper.

A still further object is to provide a demountable and detachable tread of this character having longitudinally extending wires embedded in the fabric portion of the tread, which wires are so disposed that they will form circumferentially extending ridges or ribs upon the inner face of the demountable tread which will grip the periphery of the carcass of the pneumatic tire and hold the demountable tread from any lateral slipping.

Another object is to provide in a demountable tread of the character stated a circumferentially extending band which will prevent any expansion of the tread.

Still another object is to so form this demountable tread that it will hold by suction on the tire.

Other objects will appear in the course of the following description.

My invention is illustrated in the accompanying drawings, wherein:—

Figure 1 is an elevation of a tire having my demountable or detachable tread applied thereto, the tread being broken away at two points;

Figure 2 is a fragmentary sectional perspective of the tread, the tire being shown in dotted lines;
Figure 3 is a sectional view through the tire and through the tread.

Referring to these drawings, 10 designates a relatively thick rubber tread portion which is thicker on its median line than it is at the margins, and 11 designates a plurality of layers of fabric which are adapted to be vulcanized to each other and to the tread portion 10, while 12 designates an inner lining of relativley thin rubber.

Embedded between the laminations or layers of fabric 11 on the median line of the tire is a circumferentially extending steel band 13 constituting a circumferentially extending reinforcement which prevents the demountable tread from expanding. Embedded between the layers of fabric 11 and the rubber lining 12 are a plurality of circumferentially extending wires 14. These wires 14 cause ribs 15 to be formed in the rubber lining, these ribs extending circumferentially and bearing directly against the tire carcass A. The circumferentially extending wires 14 are gradually less in diameter toward the lateral margins of the demountable tread so that these wires hold the tread transversely concave so as to fit closely the transverse convexity of the tire carcass. Thus this demountable tread has a normal transverse convexity and is, of course, annular in form. The rubber tread potion 10, the fabric layers 11, and the rubber lining 12 are all vulcanized to each other so that the demountable tread forms one coherent annular member adapted to be disposed over the tire carcass when the tire is deflated and which, when the tire is inflated, will firmly embrace the periphery of the tire and be held by reason of the ribs 15 from any lateral slipping movement on the tire. These ribs 15 caused by the wires 14 embed themselves in the tire carcass when the tire is under normal pressure, thus firmly holding the detachable or demountable tread from side movement or displacement. When, however, the tire is deflated, this tread may be readily removed. It will not, however, become accidentally detached from the tire when the tire is merely "flat."

This demountable or detachable tread may be applied to all forms of pneumatic tire, both new and old, and its use reduces the cost of maintenance and very greatly increases the life of the tires with which it is used. It will be seen that the rubber lining 12 forms in process of vulcanizing an inverted non-skid inner surface which holds by suction to the inflated tire as well as holds by reason of the circumferentially extending ribs 15.

It will be seen that my device is extremely simple and practical use has shown it to be thoroughly effective. In the formation of this tread, I place the rubber lining 12 over a form. I then place the wires 14 in position and then place over these wires a plurality of layers of fabric coated with rubber cement and, of course, cemented to the rubber layer 12. In this fabric I embed the steel band 13. I then place over the fabric the rubber tread portion 10, which completes the structure, and when the several parts are vulcanized together I secure a simple and practical tread which is easily put on or taken off when the tire is slack and which is rigidly maintained in its proper position when the tire is under normal pressure.

While I have illustrated a particular embodiment of my invention which I regard as thoroughly effective, I do not wish to be limited to this particular embodiment, as the principle of the invention might be carried out in other ways without departing from the spirit of the invention as defined in the appended claims.

I claim:—

1. A detachable and demountable tread for pneumatic tires annular in form and transversely concave upon its inner face, the tread having embedded therein inward of its inner surface a plurality of circumferentially extending wires on each side of the middle line of the tread forming circumferentially extending ribs on the inner face of the tread adapted to have gripping engagement with the tire upon which the tread is mounted.

2. A detachable and demountable tread for pneumatic tires having a circumferentially extending reinforcing band embedded in the tread on the middle line thereof, and a plurality of circumferentially extending wires embedded in the tread inward of its inner surface on each side of the band, and causing said tread to have a transversely concavo-convex form, said wires forming circumferentially extending ribs upon the inner surface of the tread.

3. A detachable and demountable tread for pneumatic tires comprising an inner lining of relatively thin material, an outer relatively thick tread portion and intermediate layers of fabric, the lining, the fabric and the outer tread portion being vulcanized to each other, a circumferentially extending band embedded in the fabric at the middle line of the tread, and circumferentially extending wires disposed between the lining and the fabric, the lining being outwardly projected by the wires to form a series of circumferentially extending ribs on the inner face of the tread and on each side of the middle line thereof, the tread having a permanently transversely concavo-convex form.

4. A demountable and detachable tread for pneumatic tires comprising an annular transversely concavo-convex body formed of laminated elements vulcanized to each other, a circumferentially extending, medially disposed band embedded in the body, and a plurality of circumferentially extending annuli embedded in the body on each side of the middle line thereof and inward of the inner face of the body, the annuli being successively smaller in diameter toward the margins of the body, said annuli forming circumferential ribs upon the inner face of the body.

In testimony whereof I hereunto affix my signature.

MARCUS A. SHOTWELL.